United States Patent
Xu et al.

(10) Patent No.: US 11,803,789 B2
(45) Date of Patent: *Oct. 31, 2023

(54) PROVISION OF REMOTE APPLICATION ACTION FEED CARDS

(71) Applicant: Citrix Systems, Inc., Fort Lauderdale, FL (US)

(72) Inventors: Sai Xu, Nanjing (CN); Yiming Wang, Nanjing (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/572,237

(22) Filed: Jan. 10, 2022

(65) Prior Publication Data

US 2022/0129811 A1    Apr. 28, 2022

Related U.S. Application Data

(63) Continuation of application No. 16/918,111, filed on Jul. 1, 2020, now Pat. No. 11,244,255, which is a continuation of application No. PCT/CN2020/095262, filed on Jun. 10, 2020.

(51) Int. Cl.
| | |
|---|---|
| G06Q 10/06 | (2023.01) |
| G06F 16/27 | (2019.01) |
| G06F 16/28 | (2019.01) |
| G06F 16/245 | (2019.01) |

(Continued)

(52) U.S. Cl.
CPC ..... *G06Q 10/06311* (2013.01); *G06F 16/245* (2019.01); *G06F 16/27* (2019.01); *G06F 16/285* (2019.01); *H04L 63/104* (2013.01)

(58) Field of Classification Search
CPC ... H04L 63/104; H04L 63/0807; G06F 16/27; G06F 16/245; G06F 16/285; G06Q 10/06311

See application file for complete search history.

(56) References Cited

U.S. PATENT DOCUMENTS

| | | | |
|---|---|---|---|
| 9,450,944 B1 | 9/2016 | Sousley et al. | |
| 10,938,979 B1 * | 3/2021 | Dave | H04M 1/72454 |
| 2002/0168054 A1 | 11/2002 | Klos et al. | |

(Continued)

FOREIGN PATENT DOCUMENTS

| | | | |
|---|---|---|---|
| CN | 106656959 A | 5/2017 | |
| CN | 108243158 A | 7/2018 | |

(Continued)

OTHER PUBLICATIONS

International Search Report and Written Opinion on PCT Appl. No. PCT/CN2020/095262 dated Mar. 8, 2021.

(Continued)

*Primary Examiner* — Etienne P Leroux

(57) ABSTRACT

Described embodiments provide systems and methods for providing remote application action feed cards. A ticket can be received from a client device. The ticket can be indicative of an action of a remote application and the remote application can be accessible by a group of users. The device can receive information about the action identified in the received ticket from at least one user of the group of users in response to provision of a determined key and the received ticket to the group of users. The device can provide the received information to client devices of user of the group of users to identify actions of other users of the group of users.

17 Claims, 5 Drawing Sheets

(51) Int. Cl.
G06Q 10/0631 (2023.01)
H04L 9/40 (2022.01)

(56) References Cited

U.S. PATENT DOCUMENTS

| | | | |
|---|---|---|---|
| 2011/0209071 A1* | 8/2011 | Pearson | G06Q 50/01 |
| | | | 709/204 |
| 2012/0042318 A1* | 2/2012 | Doan | G06Q 10/06315 |
| | | | 718/103 |
| 2012/0209947 A1 | 8/2012 | Glaser et al. | |
| 2012/0210313 A1 | 8/2012 | Cooley et al. | |
| 2013/0339514 A1* | 12/2013 | Crank | H04L 63/1408 |
| | | | 709/224 |
| 2015/0200878 A1* | 7/2015 | Shih | H04L 51/06 |
| | | | 709/204 |
| 2016/0359834 A1* | 12/2016 | Hoshino | H04L 63/0807 |
| 2018/0174229 A1 | 6/2018 | Sherwin et al. | |
| 2018/0321833 A1 | 11/2018 | Nelson et al. | |
| 2019/0080104 A1* | 3/2019 | Sturtevant | G06F 21/606 |
| 2019/0361760 A1 | 11/2019 | Krishnan et al. | |
| 2019/0379574 A1 | 12/2019 | Sun et al. | |
| 2020/0057752 A1 | 2/2020 | Tofano | |
| 2021/0004923 A1 | 1/2021 | Mackenzie et al. | |

FOREIGN PATENT DOCUMENTS

| | | |
|---|---|---|
| CN | 108781227 A | 11/2018 |
| WO | WO-2016/183066 A1 | 11/2016 |

OTHER PUBLICATIONS

Notice of Allowance on U.S. Appl. No. 16/918,111 dated Oct. 6, 2021.
Office Action on U.S. Appl. No. 16/918,111 dated Jun. 24, 2021.

* cited by examiner

PROVISION OF REMOTE APPLICATION ACTION FEED CARDS

CROSS-REFERENCE TO RELATED APPLICATIONS

This application is a continuation of, and claims priority to and the benefit of, U.S. patent application Ser. No. 16/918,111, titled "PROVISIONS OF REMOTE APPLICATION ACTION FEED CARDS," and filed on Jul. 1, 2020, which is a continuation of, and claims priority to and the benefit of, International Patent Application No. PCT/CN2020/095262, titled "PROVISIONS OF REMOTE APPLICATION ACTION FEED CARDS," and filed on Jun. 10, 2020, the contents of which are hereby incorporated herein by reference in its entirety for all purposes.

BACKGROUND

In network environments, a server can host or provide access to a plurality of resources or applications for a plurality of users. For example, a user can establish a session to particular application or resource through the server. The user may experience issues with accessing or interacting with the application or resource provided by the server. The user can submit a ticket or request to address the respective issues with the application or resource.

SUMMARY

Systems and methods for the provision of remote application action feed cards are provided. For example, this technical solution can generate a feed card conversation to consolidate an interaction history of a ticket including information indicative of actions performed via a remote application by a group of users for the ticket are provided herein. A device can consolidate or combine an interaction history (e.g., electronic communications, messages) and/or a plurality of feed cards indicative of actions performed and of a ticket (e.g., JIRA ticket) into a single data structure or feed card conversation. The feed card conversation can group or link the plurality of feed cards and interaction history of actions performed to address a ticket and provide the feed card conversation and/or enable access to the feed card conversation to a group of users. The group of users can include, but not limited to, users assigned or delegated actions of the ticket. The feed card conversation can include the interaction history between the users of the group of users including electronic messages, status updates, notes and/or ticket information such that the users can be determine what other users in the group of users have completed and/or a status on the progress of the ticket. The device can provide the feed card conversation to client devices of users of the group of users to identify actions of at least one other user of the group of users relative to the action of the received ticket. In embodiments, the feed card conversation can be provided for display through a user interface of the client devices of users of the group of users. The feed card conversation can include an interactive element configured to modify a view or display (e.g., expand, collapse, scroll) of one or more feed cards in the feed card conversation to view or hide actions of actions of different users of the group of users and receive an update on a progress of a ticket.

In at least one aspect, a method is provided. The method can include receiving, by a computing device, a ticket from a client device. The ticket can be indicative of an action of a remote application and including an identifier, and the remote application being accessible by a group of users. The method can include determining, by the computing device, a key based on the identifier of the received ticket, an indicator of the remote application, and a classification of the group of users. The method can include receiving, by the computing device, information about the action identified in the received ticket from at least one user of the group of users in response to provision of the determined key and the received ticket to the group of users. The method can include providing, by the computing device, the received information to the client device to identify actions of at least one other user of the group of users relative to the action of the received ticket. The provision of the received information can include a plurality of feed cards displayable on the client device and configured to expand or collapse to view or hide actions of different users of the remote application.

In embodiments, the actions of the at least one other user of the group of users can include a first electronic communication and the method can include receiving, by the computing device from a second client device, the first electronic communication. The method can include generating, by the computing device, a second key based at least on a combination of a second identifier of the first electronic communication, a second indicator of a second remote application of the first electronic communication, and the classification of the second client device. The method can include determining, by the computing device, the second key matches the key. The method can include providing, by the computing device responsive to the determination that the second key matches the key, the first electronic communication for provision via the plurality of feed cards.

The method can include receiving, by the computing device from at least one client device of the group of users, a request to view the ticket or one or more actions of the ticket. The method can include querying, by the computing device, a database using the key to retrieve a data structure including the ticket and the one or more actions. The method can include providing, by the computing device responsive to the request, the data structure to the at least one client device. The method can include creating the key based at least on inputting the identifier of the received ticket, the indicator of the remote application, and the classification of the group of users into a hash function. In embodiments, the method can include updating, by the computing device responsive to receiving subsequent information about the action identified in the ticket, at least one feed card of the plurality of feed cards.

The method can include receiving, by the computing device, the ticket from a microapp service configured to synchronize data with the remote application. The method can include receiving, by the computing device, information about the actions of the at least one other user of the group of users relative to the action of the received ticket from a microapp service configured to synchronize data with the remote application. The method can include determining, by the computing device, an order identifier for the actions based on a timestamp of the actions. The order identifier can indicate a sequential relation between the actions. In embodiments, the method can include modifying, by the computing device responsive to an interaction with the plurality of feed cards, a position of one or more feed cards of the plurality of feed cards to access the one or more feed cards through a display of the client device.

In at least one aspect, a device is provided. The device can include a memory and one or more processors coupled to the memory. The one or more processors can be configured to receive a ticket from a client device. The ticket can be indicative of an action of a remote application and including an identifier, and the remote application being accessible by a group of users. The one or more processors can be configured to determine a key based on the identifier of the received ticket, an indicator of the remote application, and a classification of the group of users. The one or more processors can be configured to receive information about the action identified in the received ticket from at least one user of the group of users in response to provision of the determined key and the received ticket to the group of users. The one or more processors can be configured to provide the received information to the client device to identify actions of at least one other user of the group of users relative to the action of the received ticket. The provision of the received information can include a plurality of feed cards displayable on the client device and configured to expand or collapse to view or hide actions of different users of the remote application.

In embodiments, the actions of the at least one other user of the group of users can include a first electronic communication, and the one or more processors can be further configured to receive, from a second client device, the first electronic communication. The one or more processors can be further configured to generate a second key based at least on a combination of a second identifier of the first electronic communication, a second indicator of a second remote application of the first electronic communication, and the classification of the second client device. The one or more processors can be further configured to determine the second key matches the key. The one or more processors can be further configured to provide, responsive to the determination that the second key matches the key, the first electronic communication for provision via the plurality of feed cards.

The one or more processors can be further configured to receive, from at least one client device of the group of users, a request to view the ticket or one or more actions of the ticket. The one or more processors can be further configured to query a database using the key to retrieve a data structure comprising the ticket and the one or more actions. The one or more processors can be further configured to provide, responsive to the request, the data structure to the at least one client device. The one or more processors can be further configured to create the key based at least on inputting the identifier of the received ticket, the indicator of the remote application, and the classification of the group of users into a hash function. In embodiments, the one or more processors can be further configured to update, responsive to receiving subsequent information about the action identified in the ticket, at least one feed card of the plurality of feed cards. The one or more processors can be further configured to receive the ticket from a microapp service. The microapp service can be configured to synchronize data with the remote application.

The one or more processors can be further configured to receive information about the actions of the at least one other user of the group of users relative to the action of the received ticket from a microapp service configured to synchronize data with the remote application. The one or more processors can be further configured to determine an order identifier for the actions based on a timestamp of the actions. The order identifier can indicate a sequential relation between the actions. In embodiments, the one or more processors can be further configured to modify, responsive to an interaction with the plurality of feed cards, a position of one or more feed cards of the plurality of feed cards to access the one or more feed cards through a display of the client device.

In at least one aspect, a method is provided. The method can include receiving, by computing device, a digital ticket submitted by a first client device for an application executable by the computing device. The digital ticket can include an identifier. The method can include determining, by the computing device, an indicator of a plurality of client devices that includes the first client device, and an identifier indicative of the application. The method can include storing, by the computing device, the digital ticket in a data structure identifiable by a key generated based at least on the indicator, the identifier of the application, and the identifier of the digital ticket. The method can include updating, by the computing device, the data structure with one or more subsequent electronic communications from the plurality of client devices based on the key. The one or more subsequent electronic communications can be stored in the data structure based on an order indicative of a sequential relationship between the one or more subsequent electronic communications and the digital ticket. The method can include providing, by the computing device, the data structure to at least one of the plurality of client devices to cause the at least one of the plurality of client devices to generate a graphical user interface that displays an indication of the digital ticket, one or more subsequent electronic communications, and the sequential relationship between the one or more subsequent electronic communications and the digital ticket. In embodiments, the method can include receiving, by the computing device, the ticket from a microapp service, the microapp service configured to synchronize data with the application.

The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Figure 1A:
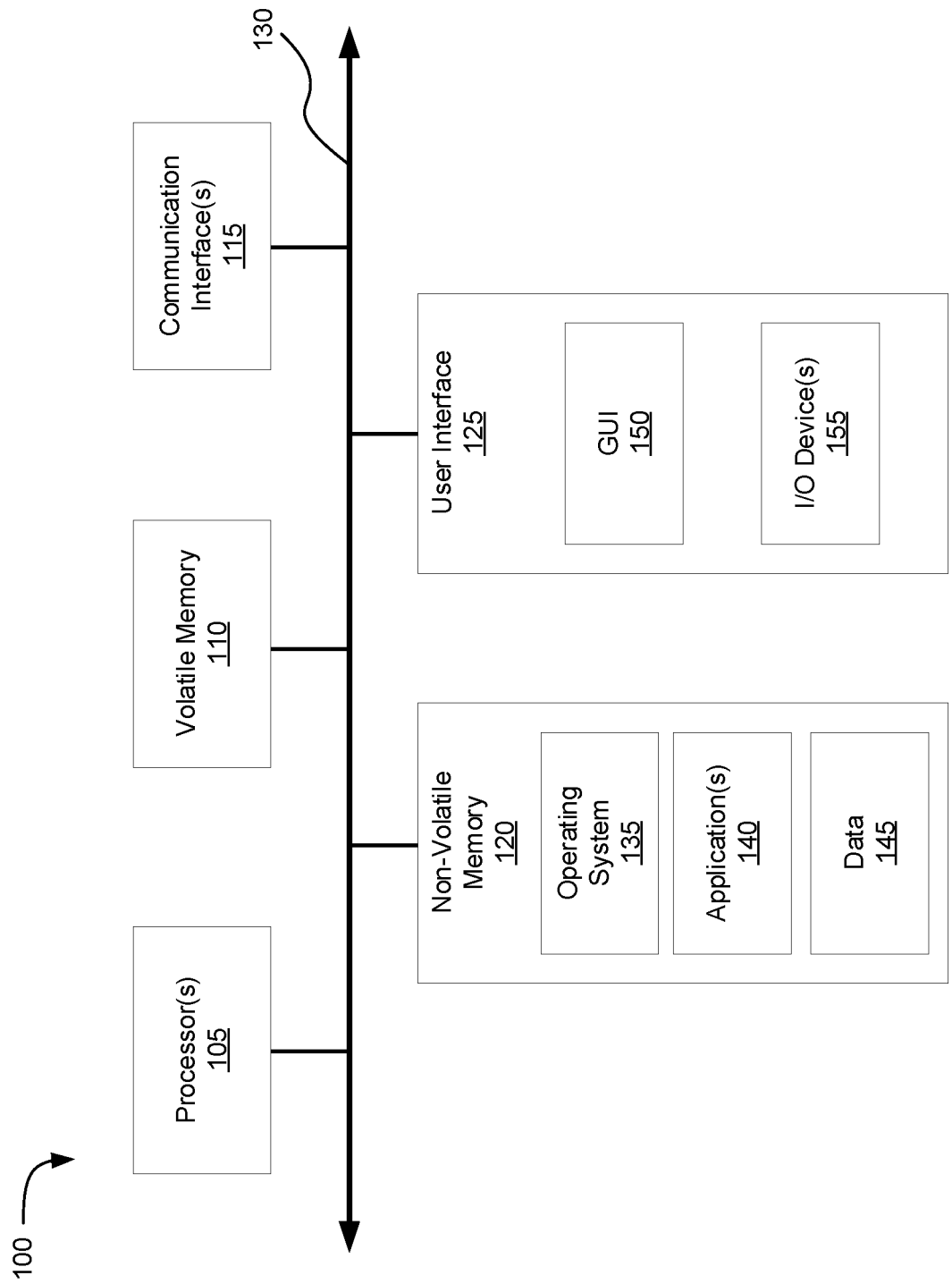
FIG. 1A is a block diagram of embodiments of a computing device.

Systems and methods for providing remote application action feed cards are provided. For example, this technical solution can generate a feed card conversation to consolidate an interaction history of a ticket or other notification (e.g., a message) including information indicative of actions performed via a remote application by a group of users for the ticket are provided herein. An interaction history can include multiple feed cards for actions performed via a remote application by a group of users to complete, close, or otherwise address a ticket can be grouped or linked under a common feed card or a feed card conversation that is accessible to each user of the group of users. For example, a ticket can be received from a client device requesting or indicating an action for a remote application that is accessible to the group of users. The ticket can include a request for actions or a workflow to close or complete the respective ticket. The group of users can perform different actions related to or otherwise associated with the ticket at different points in the workflow and feed cards can be generated for actions completed by the users. A device can group or link the multiple feed cards of the ticket into a single data structure or feed card conversation (e.g., common feed card) and make the feed card conversation accessible to the group of users such that the users can determine what actions were performed by other users of the group of users.

A ticket can be received from a client device and a workflow having a plurality of actions can be created to for that ticket (e.g., to complete or close the ticket). From the beginning of the workflow to the close or end of the workflow (e.g., creation and close of the ticket), a group of users (e.g., developers, testers, managers) can perform the actions indicated by or otherwise associated with the ticket and according to an activity feed (e.g., order of the actions). However, the users may not be able to access or determine what actions have been performed by others users in the activity feed or view communications between other users in the group of users. For example, a user (e.g., a developer) may not be able to access or determine what actions have been performed by the other users (e.g., other developers or managers) and another user may not be able to access or determine what actions have been performed by the user (e.g., the developer) or managers. In some cases, the user may be able to see an activity feed message indicating "a new issue has been assigned" and other users may be able to see an activity feed message indicating "need to provide more information." However, the developer and tester may not be able to see or access the electronic communications available to the other users. The developer and tester may not have access to an interaction history for the ticket, the activity feed information provided to the other users and/or information relating to actions performed by other users. For example, the users can be restricted to accessing the activity feed information generated (e.g., messages, communications) by the respective user and can be blocked or prevented from accessing activity history information generated by other users. This can either increase the amount of time taken to complete the actions associated with the ticket, or introduce errors or result in suboptimal completion of the ticket if the users do not obtain the information used to properly complete the ticket. In some embodiments, the users can submit individual requests to access information for specific actions. Thus, the users may submit at least one request for each action associated with a ticket and be provided access in separate or individual displays using increased computer resources to generate a plurality of displays for the different actions associated with the ticket. The increased interaction with the system to determine information for the actions performed by other users in the group or users can result in excessive remote procedure calls, further increase the amount of time taken to complete the actions of the ticket, and increase computing resource demand, while negatively impacting a graphical user interface and user experience for users submitting tickets or the users working on actions to complete the ticket.

Systems and methods of this technical solution can group the activity information of a ticket and provide access to the activity information of the ticket to the group of users. A feed card conversation or common feed card can be generated that groups or otherwise links a plurality of feed cards and interaction history generated for actions performed by the individual users into a common or single display. The feed cards can include, but are not be limited to, what action was performed, history information for the respective action, a timestamp and electronic communications between different users to perform the action. The feed card conversation can consolidate and provide the interaction history between the different users performing actions to complete or otherwise address the respective ticket in a common display such that the users can determine information on actions performed or to be performed by other users in the group of users.

The feed card conversation can link or group the activity information of a ticket under a common thread and be accessible to a plurality of different users. The feed card conversation can provide access to the multiple feed cards of the ticket through an interactive element (e.g., a triangular expand/collapse icon) such that a user from the group of users can select the icon to modify (e.g., expand, collapse, scroll) a view of one or more feed cards in the conversation and display the multiple feed cards in a common display. Thus, the users can access the different feed cards generated for the plurality of actions of the ticket and access feed cards including actions performed by other users in the group of users. The feed cards can be arranged in a determined order (e.g., based on age, based on when action was performed), for example, according to the activity feed order. Therefore, the feed card conversation can improve a graphical user interface, for example, by providing and displaying a plurality of feed cards of a ticket in a single display or single user interface. The expandable and collapsible display can enable a user to access and see the plurality of feed cards in a single display, for example, instead of accessing each feed card individually or through different systems. The expandable and collapsible display can provide the information about working on a ticket or a completed ticket to a group of users in a common display such that individual users can access the same information in one environment. The single display can provide graphical user interface improvements and reduce resource utilization by enabling users to access a plurality of feed cards, an interaction history for a ticket and other information of a ticket in a single environment instead of multiple different displays and/or environments to improve a user experience for the users performing the different actions and/or the user that submitted the respective ticket.

The feed card conversation can provide efficiency improvements in completing one or more actions of a ticket and/or completing a ticket and thus improving an overall user experience. For example, a plurality of users can be assigned to perform different actions of the ticket and can use the feed card conversation to access and be notified of when actions are completed by other users working on the same ticket. The ticket can include a determined order of actions and the users can identify when a user completes an action that they may be waiting on to complete their own respective action. The actions of a ticket can be completed in a faster and more efficient manner allowing tickets and user requests to be addressed in a faster and more efficient manner and improving an overall user experience. In embodiments, by completing tickets and/or user requests in a more efficient manner, the feed card conversation as described herein can provide performance improvements to enable users (e.g., testers, developers, engineers, managers) to address system issues in a more timely fashion faster and improve a user experience for the users performing the different actions and/or users that submitting tickets.

Section A describes a computing environment which may be useful for practicing embodiments described herein; and Section B describes methods and systems for generating a feed card conversation to consolidate an interaction history associated with a ticket described herein.

A. Computing Environment

Prior to discussing the specifics of embodiments of the systems and methods of for securing offline data (e.g., browser offline data) for shared accounts, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
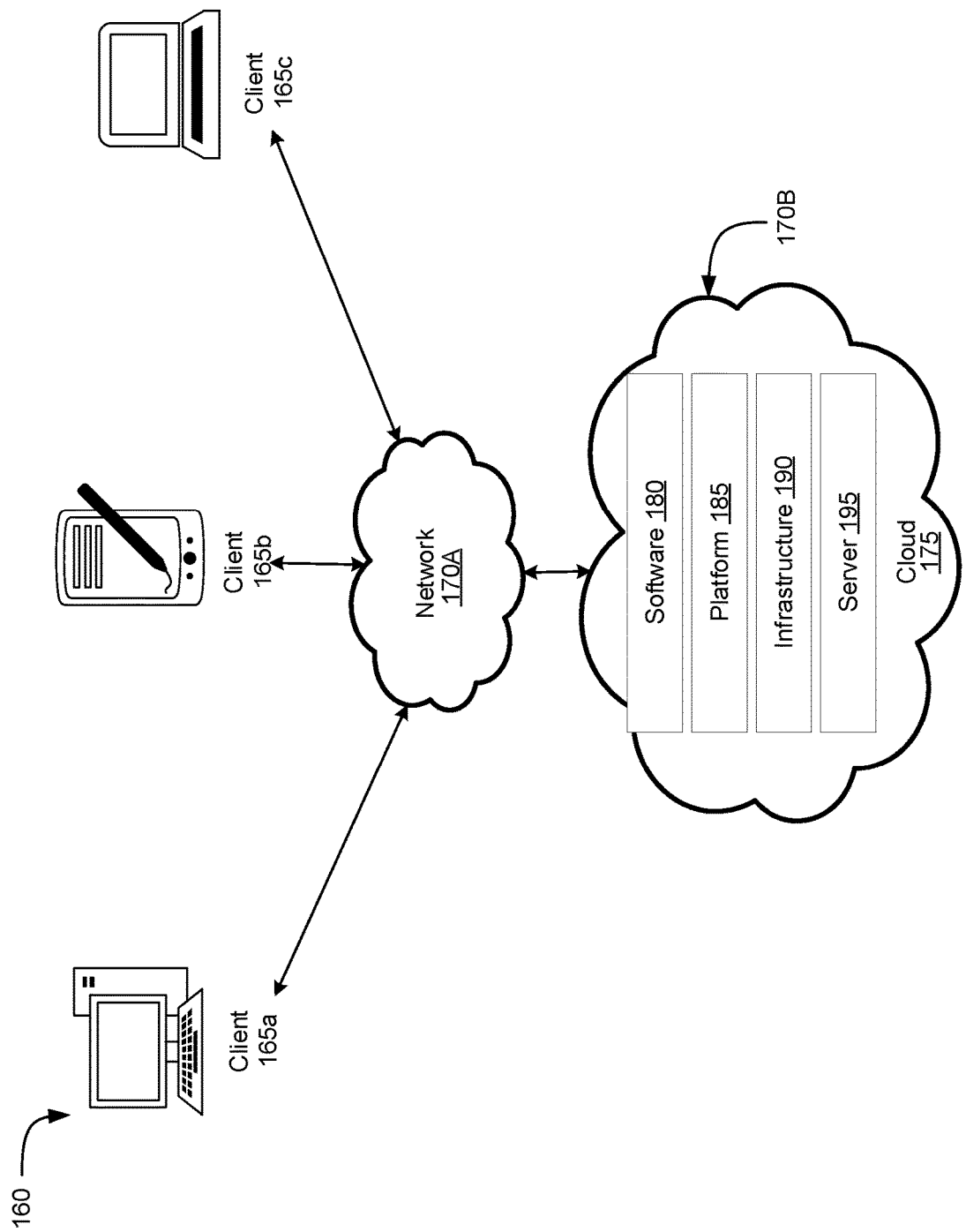
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Generating a Feed Card Conversation to Consolidate an Interaction History Associated with a Ticket Systems and methods for consolidating an interaction history of a ticket (or other notification) and indicative of actions performed by a group of users for the ticket are provided herein. The group of users can be provided with access to the interaction history to determine or identify actions performed by other users in the group of users. In embodiments, a ticket (e.g., JIRA ticket) can be received from a client device of at least one user of a group of users. The ticket or other notifications can be received through an application, for example, a remote application (e.g., SaaS app) accessed by the client device. The ticket can include a submission indicating an issue and/or requesting an action to correct an issue. The remote application can generate an identifier for the ticket and provide the ticket and identifier to a service (e.g., Micro App Service) of a device. The service can synchronize the ticket information and data with the remote application that received the ticket and provide the ticket, identifier and ticket information to the device and/or another service of the device (e.g., User Facing Notification Service). The ticket information can include a key, an identifier, the ticket, actions of the ticket, and/or an action status. The device can monitor and manage actions to address the ticket and performed by one or more users of a group of users that have access to the remove application. For example, the device can provide the ticket and ticket information (e.g., ticket key, identifier) to a client device of a user of the group of users in response to a request for the ticket information. The device can receive update on the actions, for example, in the form of data structure or feed cards generated for an action to be performed by a user of the group of users. The data structure or feed card can include the respective action, a status update (e.g., in progress, complete), a timestamp and/or an order identifier indicating a position of the respective action in a sequential order for the plurality of actions of the ticket. In some embodiments, a feed card can be generated for individual actions to address a respective ticket.

The device can consolidate or combine the plurality of feed cards for the plurality of actions of a ticket into a single data structure or feed card conversation. The feed card conversation can group or link the plurality of feed cards generated to address a ticket and provide the feed card conversation and/or enable access to the feed card conversation to the users in the group of users. In embodiments, the device can provide the received ticket information to a client device of a user of the group of users to identify actions of at least one other user of the group of users relative to the action of the received ticket. The group of users can use the feed card conversation to view an interaction history including electronic communications between other users in the group of users to determine a status of an action of a ticket and/or a status of the ticket. The feed card conversation can provide the plurality of feed cards of a ticket to the client devices of the group of users and displayable on the respective client devices such that the client devices have access to the plurality of feed cards, including feed cards indicative of actions to be or already performed by other users in the group of users. The feed card conversation can include an interactive element configured to modify a view or display (e.g., expand, collapse, scroll) of one or more feed cards in the feed card conversation to view or hide actions of actions of different users of the group of users and receive an update on a progress of a ticket.

Figure 2A:
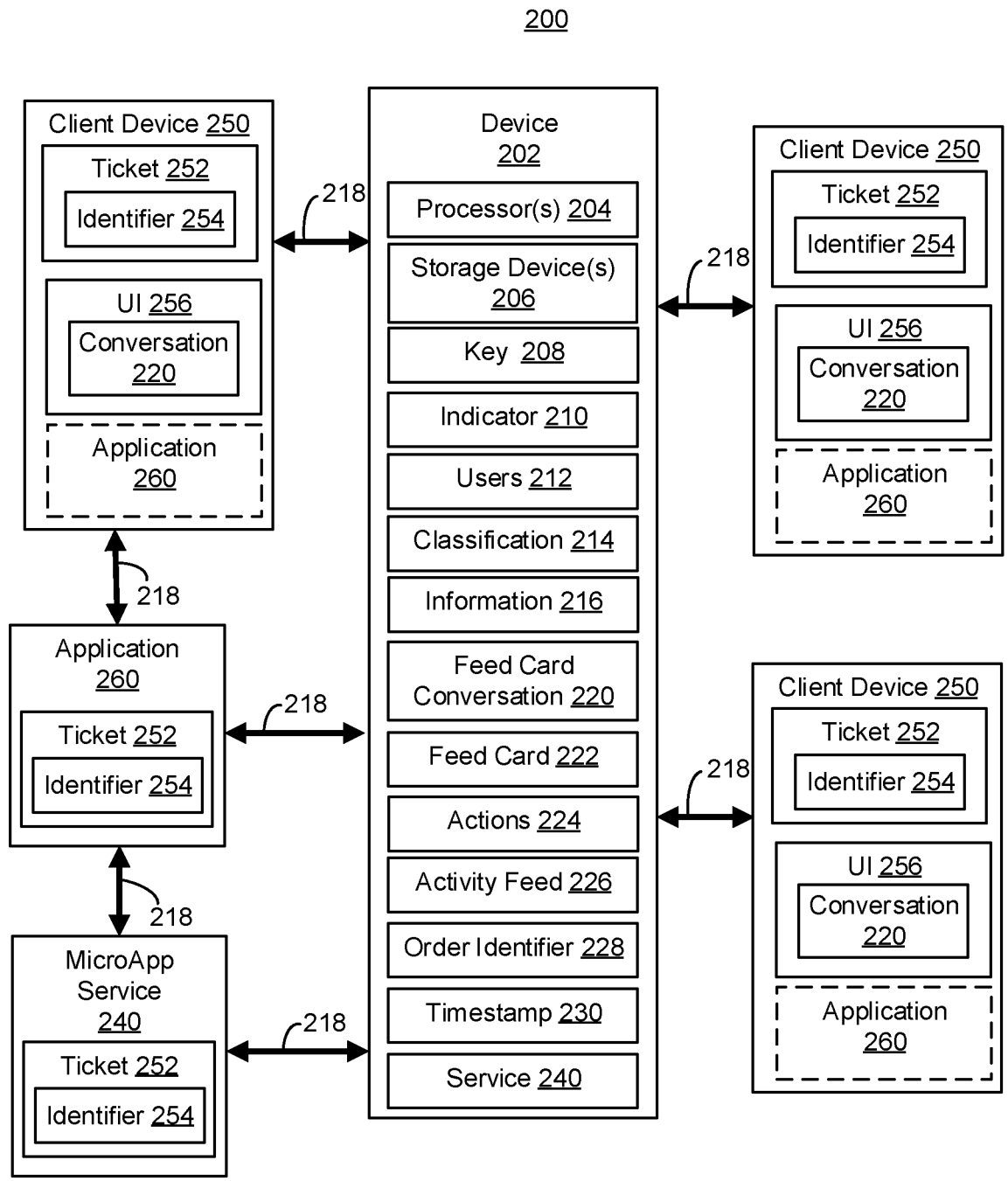
FIG. 2A is a block diagram of a system for provision of remote application action feed cards.

Referring to FIG. 2A, depicted is a block diagram of one embodiment of a computing environment 200 having a device 202 to generate a feed card conversation 220 including a plurality of feed cards 222 of a ticket 252. The computing environment 200 (e.g., server farm, private network, public cloud) can include a device 202 (e.g., computing device) to monitor and manage actions 224 of or otherwise associated with the ticket 252 and performed by a group of client device 250 of a group of users 212. For example, the device 202 can receive a ticket 252 from at least one client device 250. The ticket 252 can include or correspond to a submission indicating an issue and/or requesting an action 224 to correct an issue in the computing environment 200 and/or with an application 260. The ticket 252 can be indicative of an action 224 of a remote application 260. The device 202 can monitor and manage actions 224 to address the ticket 252 and performed by one or more users 212 of a group of users 212 that have access to the remote application 260. The device 202 can collect and store information 216 related to or otherwise associated with the actions 224 and the ticket 252. For example, the device 202 can retrieve and store one or more feed cards 222 that identify information 216 about the actions 224 and the ticket 252. The feed card 222 can be generated for individual actions 224 to address a respective ticket 252. The device 202 can generate a feed card conversation 220 that groups or links the plurality of feed cards 222 generated to address a ticket 252 and provide the feed card conversation 220 or access to the feed card conversation 220 to the users 212 in the group of users 212. The device 202 can provide the received information 216 to a client device 250 (e.g., client device that submitted ticket 252) to identify actions of at least one other user 212 of the group of users 212 relative to the action 224 of the received ticket 252. The received information 216 can be provided through the feed card conversation 220. The feed card conversation 220 can provide the plurality of feed cards 222 of a ticket 252 displayable on the client device 250 through a user interface 256 of the respective client device 250 and configured to expand or collapse to view or hide actions 224 of different users 212 of the remote application 260.

The device 202 can include or be implemented using hardware or a combination of software and hardware. For example, components of the device 202 can include logical circuitry (e.g., a central processing unit or CPU) that responses to and processes instructions fetched from a memory unit (e.g., storage device 206). Components of the device 202 can include or use a microprocessor or a multi-core processor. A multi-core processor can include two or more processing units (e.g., processor 204) on a single computing component. Components of the device 202 can be based on any of these processors, or any other processor capable of operating as described herein. Processors can utilize instruction level parallelism, thread level parallelism, different levels of cache, etc. For example, the device 202 can include at least one logic device such as a computing device or server having at least one processor 204 to communicate with one or more client devices 250. The components and elements of the device 202 can be separate components or a single component. The device 202 can include a memory component (e.g., storage device 206) to store and retrieve data (e.g., tickets 252, actions 224, feed card conversations 220, feed cards 222). The memory can include a random access memory (RAM) or other dynamic storage device, coupled with the storage device 206 for storing information, and instructions to be executed by the device 202. The memory can include at least one read only memory (ROM) or other static storage device coupled with the storage device 206 for storing static information and instructions for the device 202. The memory can include a storage device 206, such as a solid state device, magnetic disk or optical disk, to persistently store information and instructions. The device 202 can be the same as or substantially similar to computer 100 of FIG. 1A.

The device 202 can include a processor 204. The processor 204 can include non-volatile memory that stores computer instructions and an operating system. For example, the computer instructions can be executed by the processor 204 out of volatile memory to perform all or part of the method 300. In some embodiments, the device 202 can include a non-transitory computer-readable medium, comprising instructions that, when executed by the processor 204 of the device 202, cause the processor 204 to perform all or part of the method 300. The processor 204 can be connected to and/or in communication with a database (e.g., storage device 206) and be configured to generate and/or store values including, but not limited to, tickets 252, actions 224, feed card conversations 220, and feed cards 222 in the database. The processor 204 can include non-volatile memory that stores computer instructions and an operating system. For example, the computer instructions can be executed by the processor 204 out of volatile memory to perform all or part of the method 300. The device 202 can include a non-transitory computer-readable medium that includes instructions that, when executed by the processor 204 of the device 202 cause the processor 204 to execute or perform the functionalities of the method 300.

A ticket 252 can include or correspond to a data structure provided to the device 202 to identify or report an issue, for example, an issue within the computing environment 200, impacting an application 260, and/or impacting a client device 250 accessing services 240, application 260 and/or resources provided by the device 202. In one embodiment, the ticket 252 can include a ticket from an issue tracking system (e.g., a Jira ticket), a help desk ticket or issue tracker. In embodiments, the ticket 252 can include or be used as part of an issue tracking tool (e.g., issue tracking software) to identify and address issues. The ticket 252 can identify or include an identifier 254, an issue, an issue type, a project, a user 212 (e.g., an assignee), a group of users 212, a field for adding a description (e.g., description of the issue, problem), an application 260, a client device 250 and/or or user 212 submitting the ticket 252.

An identifier 254 (e.g., ticket identifier) can be generated for the ticket 252. The identifier 254 can include a token, metadata, object, code or script generated to uniquely identify a ticket 252. In embodiments, tickets 252 can be assigned a unique ticket identifier 254. The device 202 can generate an identifier 254 for a ticket 252 or group of tickets 252. In embodiments, a service 240 or application 260 (e.g., application receiving request, remote application, SaaS App) connected to the device 202 can generate the identifier 254 for a ticket 252 or group of tickets 252, for example, responsive to receiving the respective ticket 252. The tickets 252 can be stored in a storage device 206 (e.g., memory) and organized within the storage device 206 using the respective identifiers 254.

A key 208 can be determined or generated for a ticket 252. The key 208 can include a union key, a field, or combination of fields in a database table used to retrieve and sort data (e.g., ticket information) in the respective database table (e.g., storage device 206). For example, the device 202 can use the key 208 to access a ticket 252, information 216 of or otherwise associated with a ticket 252, one or more feed cards 222 of a ticket 252, and/or a feed card conversation 220 of a ticket 252. The device 202 can generate a key 208 for a ticket 252 or group of tickets 252. In embodiments, a service 240 (e.g., user facing notification service (UNS)) of the device 202 can generate the key 208 for a ticket 252 or group of tickets 252, for example, responsive to receiving the respective ticket 252. The key 208 can be generated to include a tenant identifier, an application identifier (e.g., remote application identifier, SaaS identifier) and the identifier 254 generated for the respective ticket 252. The tenant identifier can include, but not limited to, a globally unique identifier (GUID), a directory identifier or object identifier. The application identifier can identify the application indicated in the respective ticket 252.

An indicator 210 can be generated for an application 260 and/or client device 250. The indicator 210 can include an indication, identifier, tag, a token, metadata, object, code or script generated to identify an application 260 (e.g., remote application) and/or client device 250. The device 202 can generate an indicator 210 to identify an application 260 indicated in a ticket 252. The device 202 can generate an indicator 210 to identify a client device 250 submitting or providing a ticket 252. In embodiments, a service 240 or application 260 (e.g., application receiving request, SaaS App) connected to the device 202 can generate an indicator 210 to identify an application 260 indicated in a ticket 252.

Users 212 can include or correspond to a client device 250 or user of a client device 250 having access to an application 260. The users 212 can include different types of users (e.g., different types of employees, employees at different levels) having a role and/or function to perform actions 224, address issues, and/or debug issues indicated in a ticket 252. In some embodiments, the users 212 can include, but not limited to, testers, developers, engineers and/or managers assigned to or tasked with performing actions 224 and/or addressing one or issues indicated in a ticket 252. The users 212 can be organized into groups of users 212. A group of users 212 can include a plurality of users 212 assigned to or tasked with working on the same application 260 and/or same type of application 260. A group of users 212 can include different types of users (e.g., engineers, testers, developers, managers), user 212 having different roles, users 212 having different functions and/or users 212 having different responsibilities.

A classification 214 can include a category, identifier or hash function to identify a group of users 212 and/or a client device 250 (e.g., group of client devices 250). A group of users 212 can be assigned to the same application 260 and the classification 214 can identify or indicate the application 260 accessible by or otherwise associated with the group of users 212 and the group of users 212 performing actions 224 for the respective application 260. The classification 214 can identify a client device 250 associated with a user 212.

Information 216 can include data of or otherwise associated with a ticket 252, performing one or more actions 224 of a ticket 252, an interaction history of a ticket 252 and/or electronic communications (e.g., messages, conversations) associated with a ticket 252. The information 216 can include a feed card conversation 220 and/or feed cards 222 of a ticket 252. In some cases, the information 216 can include activity information, information related to or about an action 224 identified in a received ticket 252 from at least one user 212 of a group of users 212. The information 216 can be included with a feed card 222. For example, a feed card 222 can include information 216 of an action 224 of a ticket 252. The device 202 can store the information 216 in a storage device 206 (e.g., memory), for example, linked with the respective ticket 252.

A feed card conversation 220 can include one or more feed cards 222 of a ticket 252. In embodiments, the feed card conversation 220 can include a primary data structure or data table including a plurality of data structures and the data structures can include or represent feed cards 222, electronic communications and/or information 216 of individual actions 224. A feed card conversation 220 can include a grouping of feed cards 222 generated for actions 224 of a ticket 252. The feed card conversation 220 can include or correspond to a messaging channel or messaging tool to group or link a plurality of electronic communications (e.g., feed cards 222) and information 216 of the same or common ticket 252 in a single or common thread.

A feed card 222 can include an electronic communication, a message, a data structure, a portion of a messaging channel or portion of a conversation. The feed card 222 can be generated for an action 224 or responsive to a user 212 performing an action 224. The feed card 222 can include information 216 on the action 224 performed (e.g., how much was done, was it completed, did test fail, was test successful), a user 212 performing the respective action 224 and/or interaction history for one or more users associated with the action 224. In embodiments, the feed cards 222 can be generated by the device 202, a client device 250 of a user 212 performing an action 224 and/or a user 212.

An action 224 can include a task, function, operation or work of a ticket 252. For example, an action 224 can include a task, function, operation or work assigned or delegated to a user 212 to address an issue or respond to an issue identified in a ticket 252. An action 224 can include an electronic communication, for example, between two or more users 212. An action 224 can include or be assigned a timestamp 230. The timestamp 230 can include a digital record of a time of occurrence of a particular event (e.g., perform an action 224). The timestamp 230 can indicate a time when an action was initiated, performed or completed. In embodiments, a timestamp 230 can include a time range between when an action was initiated, performed and/or completed. The timestamp 230 can include or indicate one or more stages during a progression of performing and/or completing an action 224.

The actions 224 for a ticket 252 can be organized or grouped into an activity feed 226. The activity feed 226 can include an electronic listing, a messaging channel or notification system to organize actions 224 for a ticket 252. The activity feed 226 can include a listing of actions 224 to be performed for a ticket 252 and/or already performed or completed for a ticket 252. In embodiments, the activity feed 226 can indicate whether an action 224 has been started, is in progress or has been completed. In some embodiments, the activity feed 226 can list the actions 224 for a ticket 252 in a sequential or determined order. For example, the activity feed 226 can list the actions 224 for a ticket 252 in a sequential order indicating when actions 224 are to be performed respective of the other actions 224 of the ticket 252. The actions 224 can be assigned an order identifier 228 indicating a sequential relation between the actions 224 of a ticket 252. The order identifier 228 can include a tag or label assigned to an action 224. The device 202 can organize the actions 224 in an activity feed 226 using the order identifiers 228. For example, the device 202 can determine an order identifier 228 for the actions 224 of a ticket 252 based on a timestamp 230 of the actions 224. The order identifier 228 indicating a sequential relation between the actions 224 using the respective timestamp 230. In embodiments, the actions 224 can be individual assigned an order identifier 228 indicating the respective actions 224 place in the sequential order with respect to the other actions 224 of the ticket 252.

A service 240 can include an application, resource, configured to perform one or more tasks for the device 202, an application 260, a server and/or a client device 250. In embodiments, device 202 can include or execute one or more services 240. The services 240 can include software, hardware or a combination of software and hardware to perform automated tasks, responds to hardware events, or respond to request for data from one or more processors 204 of the device 202. The services 240 can include a Micro App service 240 and/or a user facing notification service 240. The services 240 can include or be made up of multiple microservices. The services 240 can include any of the services described herein with respect to FIG. 1B (e.g., Software as a Service (SaaS) 180, Platform as a Service (PaaS) 185, and Infrastructure as a Service (IaaS) 190).

An application 260 can include can include resources, desktops, and or files. In embodiments, the applications 260 can include native applications (e.g., native or local to a client device 250, local to a client device 250), remote applications, hosted applications (e.g., virtual applications, virtual desktops), Software as a Service (SaaS) applications, virtual desktops, virtual applications, web applications, mobile applications, and other forms of content. In some embodiments, the applications 260 can include or correspond to applications provided by remote servers or third party servers.

The client device 250 can include, but not limited to a computing device or a mobile device. The client device 250 can include or correspond to an instance of any client device, mobile device or computer device described herein. For example, the client device 250 can be the same as or include one or component or functionality of computer 100 depicted in FIG. 1A. The client device 250 can couple with or otherwise connect to the device 202 to establish one or more connections 218 to one or more applications 260 and/or one or more services 240. The client devices 250 can transmit or provide ticket 252 to an application 260 through at least one connection 218 to the application 260. In embodiments, the client device 250 can execute or run a client application, for example, provided by device 202 to provide access to an application 260, services 240, device 202 or to enable access to an application 260, service 240, device 202 or resource provided by the device 202. For example, the client application can execute or run within a browser (e.g., embedded browser) of the client device 250. The client device 250 can include a user interface 256 to display, provide access and/or interact with a feed card conversation 220 and a plurality of feed cards 222. The user interface 256 can be the same as or include one or more component or functionality of user interface 125 and graphical user interface 150 of FIG. 1A.

The connections 218 can include a channel, connection or session between a client device 250 and the device 202, an application 260 and/or service 240, between the device 202 and an application and/or service 240. The connection 218 can correspond to or be used to establish an application session (e.g., virtual application), an execution session, a desktop session, a hosted desktop session, a terminal services session, a browser session, a remote desktop session, a URL session and/or a remote application session. The connection 218 may include encrypted and/or secure sessions established between a client device 250 and the device 202, an application 260 and/or service 240, between the device 202 and an application and/or service 240. For example, a connection 218 may include an encrypted session and/or a secure session established between a client device 250 and the device 202, an application 260 and/or service 240, between the device 202 and an application and/or service 240. The encrypted connection 218 can include an encrypted file, encrypted data or traffic transmitted between a client device 250 and the device 202, an application 260 and/or service 240, between the device 202 and an application and/or service 240.

The above-mentioned elements or entities may be implemented in hardware, or a combination of hardware and software, in one or more embodiments. Components of the device 202 may be implemented using hardware or a combination of hardware or software detailed above in connection with FIGS. 1A-1B. For instance, these elements or entities can include any application, program, library, script, task, service, process or any type and form of executable instructions executing on hardware of a device (e.g., device 202). The hardware includes circuitry such as one or more processors in one or more embodiments.

Figure 2B:
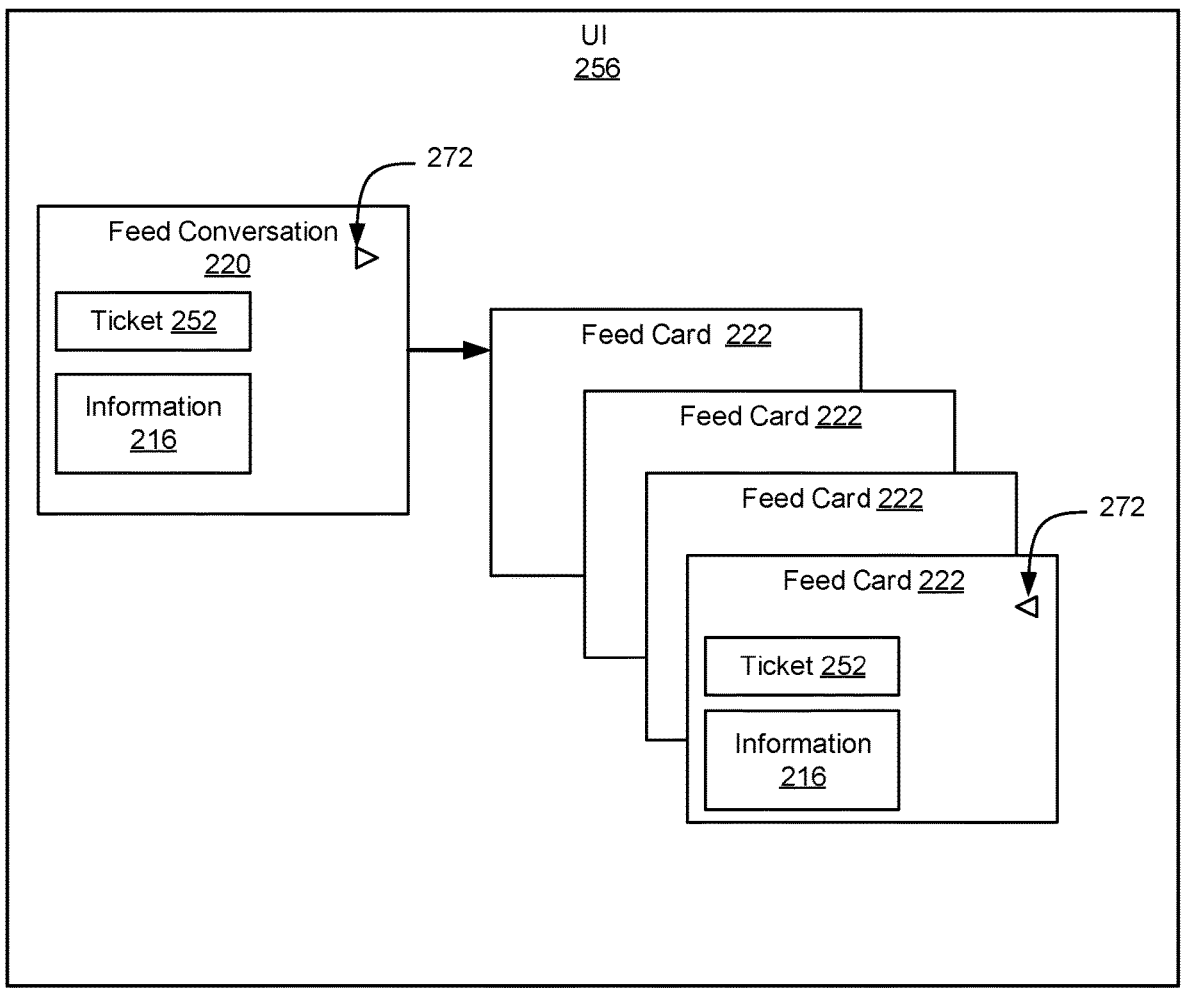
FIG. 2B is a block diagram of a feed card conversation including a plurality of feed cards.

Referring now to FIG. 2B, depicted is a feed card conversation 220 including a plurality of feed cards 222 provided through a user interface 256 of a client device 250. For example, in FIG. 2B, the feed card conversation 220 is shown in an expanded or full view such that portions of individual feed cards 222 forming the feed card conversation 220 are displayed, visible, or viewable. The feed card conversation 220 can include or correspond to an interaction history of one or more actions 224 of a ticket 252. The feed card conversation 220 can include or correspond to a data structure (e.g., primary data structure) and the plurality of feed cards 222 can include or correspond to individual data structures. The feed card conversation 220 can improve a graphical user interface of a client device 250, for example, by providing and displaying the plurality of feed cards 222 of a ticket 252 in a single display or single user interface.

The feed card conversation 220 can provide access to the multiple feed cards 222 of the ticket 252 through an interactive element 272. The interactive element 272 can include an icon, pictogram or ideogram displayed on a client device 250 to enable a user of the client device 250 to interact with the feed card conversation 220 and the plurality of feed cards 222 responsive to a user interaction with the interactive element 272. For example, the feed card conversation 220 can include the interactive element 272 (e.g., expand icon, collapse icon, scroll) to modify a display of one or more of the feed cards 222 of the feed card conversation 220. In embodiments, the interactive element 272 can cause the plurality of feed cards 222 to expand responsive to a first user interaction (e.g., click on, select, hover over for determined time period) with the interactive element 272 and cause all or portions of each of the plurality of feed cards 222 to be exposed or visible through a user interface of a client device 250. In some embodiments, the interactive element 272 can include a scrolling function responsive to a second user interaction or subsequent user interaction to allow a user to scroll or move a display of one or more of the feed cards 222 to make a second of different feed card 222 more visible or more prominently shown for display in a user interface of a client device 250. A third or subsequent user interaction (e.g., click on, select, hover over for determined time period) with the interactive element 272 can cause the plurality of feed cards 222 to collapse such that the plurality of feed cards 222 are aligned or such that a first or one feed card 222 of the plurality of feed cards 222 is visible. The interactive element 272 can be provided a variety of different shapes (e.g., triangle, square, rectangle, circle) and sizes and the shape and/or size of the interactive element 272 can be selected based at least in part on the size and/or shape of the feed card conversation 220, the feed cards 222, and/or the display parameters of a client device 250.

The device 202 can provide access to the client devices 250 to the interaction history and plurality of feed cards 222 for a ticket 252 using the feed card conversation 220. The expandable and collapsible display or modifiable display provided through the interactive element 272 can enable a client device 250 (e.g., user of client device) to access and see the plurality of feed cards 222 in a single display, for example, instead of accessing individual feed cards 222 or requesting individual feed cards 222 from the device 202. The feed card conversation 220 including the interactive element 272 can provide the information about working on a ticket 252 or of a completed ticket 252 to a group of users 212 in a common display such that each of the users 212 can access the same information in one environment.

Figure 3:
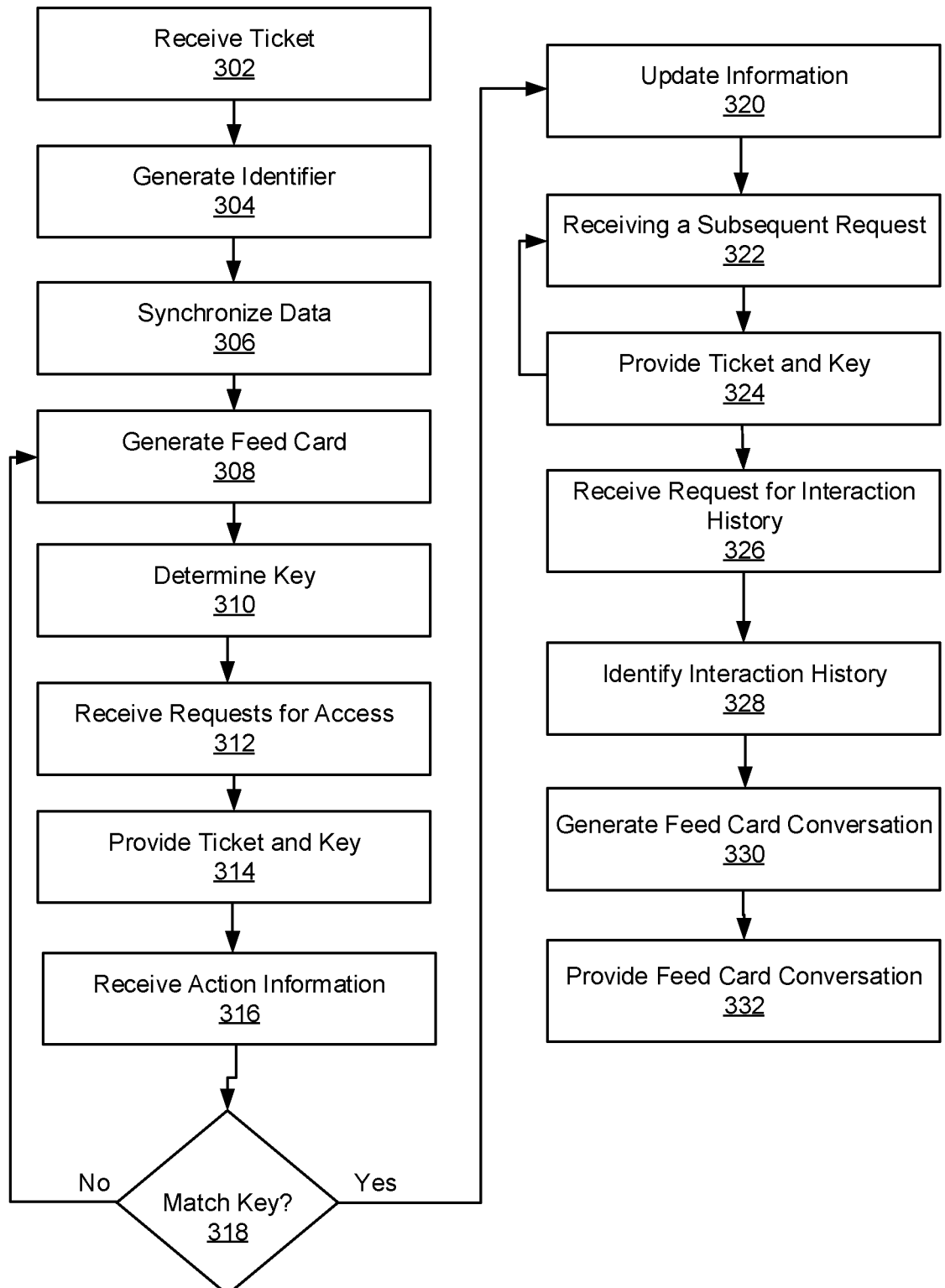
FIG. 3 is a flow diagram of a method for providing remote application action feed cards.

Referring now to FIG. 3, depicted is a flow diagram of one embodiment of a method 300 for selecting a version of an application. In brief overview, the method 300 can include one or more of: receiving a ticket (302), generating an identifier (304), synchronizing data (306), generating a feed card (308), determining a key (310), receiving a request for access (312), providing the ticket and the key (314), receiving action information (316), a determination can be made if a key corresponds to the key for the ticket (318), updating information (320), receiving a subsequent request for access (322), providing the ticket and the key (324), receiving a request for an interaction history associated with a ticket (326), identifying an interaction history for a ticket (328), generating a feed card conversation (330), and providing the feed card conversation (332). The functionalities of the method 300 may be implemented using, or performed by, the components detailed herein in connection with FIGS. 1A-2B.

Referring now to operation (302), a ticket can be received. A device 202 (e.g., computing device) can receive a notification or ticket 252 (e.g., digital ticket) from a client device 250. The ticket 252 can be indicative of an action of a remote application 260 and including an identifier 254. The remote application 260 can be accessible by a group of users 212. The ticket 252 can be received from or submitted by a client device 250 of a user 212 from the group of users 212. In some embodiments, the ticket 252 can be received from a client device 250 of a user 212 outside of the group of users 212 or not included in the group of users.

The ticket 252 can indicate an issue with a computing environment 200, an issue with an application 260 (e.g., performance issue), an issue impacting the client device 250 of the user 212 submitting the ticket 252, a request to address an issue or a submission to report an issue. The ticket 252 can identify or include an identifier 254, an issue, an issue type, a project, a user 212 (e.g., an assignee), a group of users 212, a description (e.g., description of the issue, problem), an application 260, a client device 250 and/or or user 212 submitting the ticket 252. The ticket 252 can include or indicate one or more actions 224 to address the issue. In embodiments, the action 224 can include a task, function, operation or work assigned or delegated to a user 212 to perform to address an issue with the computing environment 200, an issue with an application 260 (e.g., performance issue), and/or an issue impacting the client device 250 of user 212 submitting the ticket 252. The action 224 can include or correspond to interactions between two or more users 212 of the group of users 212, electronic communications between the two or more users 212 of the group of users 212. The ticket 252 can be submitted through at least one application 260 (e.g., SaaS app), for example, a client application executing or providing access to the application 260 through the client device 250. The application 260 can include an issue tracking tool (e.g., issue tracking software) to identify and address issues by receiving and collecting tickets 252 submitted by users 212.

Referring now to operation (304), an identifier can be generated. The device 202 can generate an identifier 254 for the ticket 252. In some cases, the application 260 or remote application 260 (e.g., SaaS app) receiving the ticket 252 can generate an identifier 254 for the ticket 252. The identifier 254 can include or correspond to a token, metadata, an object, a code or script generated to uniquely identify the ticket 252. In embodiments, individual tickets 252 can be assigned a unique ticket identifier 254. The ticket 252 can include an identifier 254 when the ticket 252 is submitted, for example, the client device 250 submitting the ticket 252 can generate the identifier 254. The device 202 or service 240 can generate an indicator 210 for the remote application 260. The indicator 210 can include an indication, identifier, tag, a token, metadata, object, code or script generated to identify the remote application 260, for example, indicated in the ticket 252.

The device 202 can label the ticket 252 with the identifier such that the ticket 252 can maintain or keep the identifier 254 for an entire workflow of the ticket 252. For example, the ticket 252 can maintain the identifier 254 as different users 212 perform different actions 224 of the ticket 252 such that the ticket 252 and identifier 254 are passed to the users 212 performing actions 224 of the ticket 252. The device 202 can use the identifier 254 to track and monitor one or more actions 224 performed for the ticket 252 and an interaction between users performing actions 224 for the ticket 252. The device 202 can store the ticket 252 and identifier 254 in a database (e.g., storage device 206). In embodiments, the application 260 or remote application 260 (e.g., SaaS app) receiving the ticket 252 can store the ticket 252 and identifier 254 in a database (e.g., storage device 206).

Referring now to operation (306), and in some embodiments, data can be synchronized. The device 202 can synchronize data of the ticket 252 between two or more applications 260. In embodiments, a service 240 (e.g., Micro Apps Service) of the device 202 can synchronize data of the ticket 252 with an application 260 receiving the ticket 252 from the client device 250. For example, the service 240 can retrieve or obtain the ticket 252, the identifier 254, and/or data of the ticket 252 (e.g., client device 250 submitting ticket, user of client device 250, time received) from the application 260. In embodiments, the service 240 can transmit a request for data associated with the ticket 252 and receive a response from the application 260 that include the ticket 252, the identifier 254, and/or data of the ticket 252 (e.g., client device 250 submitting ticket, user of client device 250, time received).

Referring now to operation (308), and in some embodiments, a feed card can be generated. A first or initial feed card 222 for the ticket 252 can be generated and provided to the device 202. For example, the device 202 or service 240 can generate the first or initial feed card 222 for the ticket 252 responsive to synchronizing the ticket data with the application 260 receiving the ticket 252. The device 202 or service 240 can generate the first or initial feed card 222 for the ticket 252 responsive to receiving a first or initial electronic communication from the client device 250 via the remote application 260. The service 240 can provide the feed card 222 to the device 202. In some embodiments, the service 240 can generate or create a new ticket 252 corresponding to the received ticket 252 from the client device 250 and provide the new ticket 252 and the identifier 254 to the device 202, for example, included with the feed card 222. The new ticket 252 can include the same data and information as the original ticket 252 and be reformatted, for example, for communication to the device 202 and/or between a group of users 212. In some embodiments, the device 202 can generate the first or initial feed card 222 for the ticket 252 responsive to receiving the ticket 252 and identifier 254 from the service 240. The feed card 222 can include or identify the ticket 252, the identifier 254, and/or data of the ticket 252 (e.g., client device 250 submitting ticket, user of client device 250, time received). The feed card 222 can include a data structure to maintain, store and update data of a ticket 252.

Referring now to operation (310), and in some embodiments, a key can be determined. The device 202 can determine or generate a key 208 based on the identifier 254 of the received ticket 252, an indicator 210 of the remote application 260, a classification 214 of the group of users 212 and/or an indicator or identifier of the client device 250. The device 202 can determine the key 208 responsive to receiving the feed card 222 from the service 240 (e.g., Micro App service). In embodiments, the device 202 can create the key 208 based at least on inputting the identifier 254 of the received ticket 252, the indicator 210 of the remote application 260, and the classification 214 of the group of users 212 into a hash function. For example, the key 208 can include or correspond to a hash function made of the identifier 254 of the received ticket 252, the indicator 210 of the remote application 260, and the classification 214 of the group of users 212. The device 202 can generate a key 208 for a ticket 252 or group of tickets 252.

The key 208 can include or correspond to a union key, a field, or combination of fields in a database table used to retrieve and sort the ticket data in a database table (e.g., storage device 206) of the device 202. In embodiments, the device 202 can use the key 208 to access a ticket 252, information 216 of a ticket 252, one or more feed cards 222 of a ticket 252, and/or a feed card conversation 220 of a ticket 252. The device 202 can generate a key 208 for a ticket 252 or group of tickets 252. The key 208 can be generated to include a tenant identifier, an application identifier (e.g., identifier for remote application that received ticket, SaaS app identifier) and the identifier 254 generated for the respective ticket 252. In embodiments, the device 202 can use the key 208 to access a ticket 252, information 216 of a ticket 252, one or more feed cards 222 of a ticket 252, and/or a feed card conversation 220 of a ticket 252.

The device 202 store and maintain information 216 of the ticket 252 on a database (e.g., storage device 206) of the device 202. For example, the device 202 can generate a data structure including a plurality of entries to store, maintain and update information 216 associated with the ticket 252. The information 216 can include, but not limited to, actions 224 of a ticket 252, an interaction history of a ticket 252 and/or messages of a ticket 252. In embodiments, the information 216 can include activity information, information related to or about an action 224 identified in a received ticket 252 from at least one user 212 of a group of users 212. The device 202 can store the ticket 252 in the data structure identifiable by the key 208 generated based at least on an indicator 210 or identifier of the client device 250, the indicator 210 or identifier of the application 260, and the identifier 254 of the ticket 252. The device 202 can organize or store the information 216 using feed cards 222 (e.g., data structures). For example, the device 202 can generate a feed card 222 for an action 224 performed by a client device 250 of a user 212. In embodiments, the device 202 can receive a feed card 222 from a client device 250 responsive to the client device 250 performing an action 224 of a ticket 252. The feed card 222 can include information 216 of an action 224 of the ticket 252, an interaction history of a ticket 252 and/or messages of a ticket 252. The device can store the feed cards 222 for the ticket 252 in the data structure (e.g., storage device 206), for example, grouped by or linked with the respective ticket 252, identifier 254 and key 208.

The device 202 can determine an order or sequential relationship for the actions 224 of the ticket 252 and organize the data structures (e.g., feed cards 222) for actions 224 in a database based in part on the order or sequential relationship for the actions 224. For example, the device 202 can assign an order identifier 228 to actions 224 of a ticket 252 indicating an order for the respective action to be completed with respect to other actions of the ticket 252. In some embodiments, the device 202 can organize the actions 224 for a ticket 252 into an activity feed 226. The activity feed 226 can include or correspond to an electronic listing for organizing the actions 224 for a ticket 252. The device 202 can maintain and update the activity feed 226 to indicate a status for the actions 224. For example, the activity feed 226 can indicate whether an action 224 has been started, is in progress or has been completed. In some embodiments, the activity feed 226 can list the actions 224 for a ticket 252 in a sequential or determined order based in part on the order identifier 228 assigned to the respective action 224. The device 202 can store and maintain the activity feed 226 in a data structure associated with the ticket 252.

The device 202 can update the activity feed 226 and actions 224 to include a timestamp 230 for an action 224. The timestamp 230 can indicate a time when an action 224 was performed, is scheduled to be performed or when a last or most recent update for the action 224 was received. In embodiments, the device 202 can determine an order identifier 228 for the actions based on a timestamp 230 of the actions 224. The device 202 can assign a timestamp 230 to an action 224 or update a timestamp 230 for action 224 responsive to receiving an electronic communication from a client device 250 of a user 212 of the group of users 212. The electronic communication can include an update on a status for an action 224 and/or a timestamp 230 indicating when the change in the status of the action 224 occurred. In embodiments, the device 202 can determine an order identifier 228 for the actions based on a timestamp 230 of the actions 224. The device 202 can determine or assign the order identifier 228 for an action 224 responsive to assigning or receiving the timestamp 230.

Referring now to operation (312), a request for access to ticket information or to view ticket information can be received. The device 202 can receive, from at least one client device 250 of the group of users 212, a request to view the ticket 252 and/or one or more actions 224 of the ticket 252. In embodiments, the request can be received from a client device 250 of a user 212 assigned to or delegated to perform one or more actions 224 of the ticket 252. The device 202 can use an identifier 254 or ticket information 216 to determine the key 208 of the ticket 252. The device 202 can retrieve the key 208 for the ticket 252 responsive to the request from the client device 250. In some embodiments, the request from the client device 250 can include the key 208 generated for the ticket 252. The device 202 can search or query the database using the key 208 to retrieve the data structure that includes the ticket 252 and the one or more actions 224. For example, the device 202 can use the key 208 generated for the ticket 252 to identify the data structure created to store the information 216 of the ticket 252 (e.g., actions 224, identifier 254). The data structure can include the ticket information 216, including but not limited to, the ticket 252, actions 224 of the ticket, and/or an action status. In some embodiments, the data structure can include updates to the actions 224. For example, the data structure can indicate which actions 224 have been completed, are in progress or haven't been initiated. The device 202 can update the status of an action 224 for the ticket 252 in the data structure responsive to receiving and/or receiving a feed card 222 of the action 224.

The device 202 can identify an action 224 or actions 224 assigned to or delegated to the client device 250 requesting the ticket information 216 or user of the client device 250 requesting the ticket information 216. For example, the device can identify the user of the client device 250 and determine which actions 224 have been assigned to or delegated to which users 212 in the group of users 212 based on the user type (e.g., tester, developer, engineer) and/or an identifier of the client device, In some embodiments, the actions 224 can include a tag or label identifying (e.g., developer task, tester task, engineer task) which users 212 in the group of users 212 have been assigned or delegated the respective action 224.

Referring now to operation (314), the ticket with the key can be provided. The device 202 can provide, responsive to the request, the data structure to the at least one client device 250. The device can provide the data structure including the ticket 252, the key 208, and/or information indicative of one or more actions 224 of the ticket 252. In embodiments, the actions 224 can include or correspond to actions requested by the client device 250 requesting the ticket information 216. In embodiments, the actions 224 can include or correspond to actions 224 assigned to or delegated to the client device 250 requesting the ticket information 216 or user of the client device 250 requesting the ticket information 216. In some embodiments, the actions 224 can include or correspond to the actions 224 of the ticket 252 and an action status for individual actions 224.

Referring now to operation (316), action information can be received. The device 202 can receive information 216 about the action 224 identified in the received ticket 252 from at least one user 212 of the group of users 212 in response to provision of the determined key 208 and the received ticket 252 to the group of users 212. The actions 224 and/or action information can include a status of an action 224 and/or electronic communications between two or more users of the group of users 212. The device 202 can receive information 216 corresponding to an action 224 performed by at least one client device 250 and/or an action 224 completed by at least one client device 250. The device 202 can receive one or more electronic communications from client devices 250 of one or more users 212 of the group of users 212. The device 202 can receive information 216 and/or electronic communications from client devices 250 of users 212 of the group of users 212, remote applications 260 and/or services 240 of the device 202. For example, the device 202 can receive information 216 including electronic communications between two or more users 212 of the group of users 212. The device 202 can receive information 216 about actions 224 of at least one other user 212 of the group of users 212 relative to the action 224 of the received ticket 252 from a service 240 (e.g., Micro App Service) configured to synchronize data with the remote application 260.

Referring now to operation (318), a determination can be made if the information received corresponds to an existing ticket 252. The device 202 can determine if the action information 216 and/or electronic communications are associated with or otherwise related to the ticket 252, for example, using a key 208 received with the information 216 and/or electronic communication. The device 202 can compare the key 208 received with the information 216 and/or electronic communication to the key 208 determined for the ticket 252. If the key 208 received with the information 216 and/or electronic communication does not match the key 208 determined for the ticket 252, the method 300 can move to (308) to generate a feed card 222 for the new information 216 and/or new electronic communication. If the information 216 and electronic communication received does not include a key 208, the method 300 can move to (308) to generate a feed card 222 for the new information 216 and/or new electronic communication. If the key 208 received with the information 216 and/or electronic communication matches or is the same the key 208 determined for the ticket 252, the method 300 can move to (320) to update the information 216 for the ticket 252 with the new information 216 and/or new electronic communication.

Referring now to operation (320), information can be updated for the ticket. The device 202 can update a data structure or feed card conversation 220 linking or grouping a plurality of data structures for other electronic communications associated with or otherwise related to the ticket 252 to include the received the action information 216 and/or electronic communication. The device 202 can determine that the action information 216 and/or electronic communications are associated with or related to the ticket 252 and update a data structure or feed card conversation 220 linking or grouping a plurality of data structures for other electronic communications associated with or otherwise related to the ticket 252 to include the received the action information 216 and/or electronic communication.

The device 202 can receive, from a client device 250 (e.g., second client device, subsequent client device) of a user 212 of the group of users 212, an electronic communication (e.g., first electronic communication, subsequent electronic communication). The electronic communication can include or correspond to a feed card 222. The electronic communication can include or identify an action 224, a status of the action 224 (e.g., in progress, complete), an order identifier 228 for the action 224, a timestamp 230 (e.g., indicating when action was performed), an indicator 210 for an application 260, an identifier for the client device 250, and/or a classification 214 for the client device 250 (e.g., classification 214 for the group of users 212).

The device 202 can generate a second key 208 responsive to receiving the electronic communication. The device 202 can generate a second key 208 based at least on a combination of the identifier or indicator 210 for the remote application 260 of the electronic communication and the classification 214 of the client device 250 providing the electronic communication. In embodiments, the second key 208 can include a hash function based at least on a combination of the of the identifier or indicator 210 for the remote application 260 of the electronic communication and the classification 214 of the client device 250 providing the electronic communication. The device 202 can determine the second key 208 matches the first key 208 or original key 208 determined for the ticket 252. The device 202 can determine that the electronic communication corresponds to a communication of an action 224 for the ticket 252. The device 202 can provide, responsive to the determination that the second key 208 matches the first key 208, the first electronic communication for provision via the plurality of feed cards 222. In embodiments, the device 202 can include, link or group a feed card 222 received with the electronic communication with the plurality of feed cards 222 of the ticket 252. The device 202 can update one or more feed cards 222 responsive to responsive to receiving information 216 about the action 224 of the ticket 252. For example, the device 202 can update a data structure or feed card conversation 220 linking or grouping a plurality of data structures for other electronic communications associated with or otherwise related to the ticket 252 to include the received electronic communication or one or more subsequent electronic communications.

The device 202 can generate a new feed card 222 for the electronic communication responsive to determining the second key 208 matches the first key 208 and that the electronic communication corresponds to a communication about an action 224 for the ticket 252. The device 202 can generate the feed card 222 to include an action 224 associated with or otherwise related to the electronic communication, a status of the action 224 (e.g., in progress, complete), an order identifier 228 for the action 224, a timestamp 230 (e.g., indicating when action was performed), an indicator 210 for an application 260, an identifier for the client device 250, and/or a classification 214 for the client device 250 (e.g., classification 214 for the group of users 212). The device 202 can update a data structure or feed card conversation 220 linking or grouping a plurality of feed cards 222 to include the feed card 222 generated for the received electronic communication and/or feed cards 222 generated for one or more subsequent electronic communications.

The device 202 can update the data structure and/or feed card conversation 220 with one or more subsequent electronic communications from the plurality of client devices 250 based on the key 208. The one or more subsequent electronic communications can be stored in the data structure and/or feed card conversation 220 based on an order indicative (e.g., order identifier 228) of a sequential relationship between the one or more subsequent electronic communications and the ticket 252. The device 202 can continue to update a data structure or feed card conversation 220 of a ticket 252 responsive to receiving electronic communications associated with or otherwise related to the ticket 252, receiving feed cards 222 associated with or related to the ticket 252 and/or receiving information 216 of the ticket 252. The device can maintain the data structure or feed card conversation 220 for a ticket 252 to provide a current status of one or more actions 224 of the ticket 252 to the group of users 212.

Referring now to operation (322), a subsequent request to view ticket information can be received. The device 202 can receive, from at least one client device 250 of the group of users 212, a subsequent request to view the ticket 252 and/or one or more actions 224 of the ticket 252. The device 202 can receive a request from a second client device 250 of the group of users 212 or different client device 250 from the first client device 250 that transmitted the first request to view the ticket information 216.

For example, the users of the group of users 212 can request via their respective client devices 250 to view the ticket information 216 at one or more points during a workflow or activity period of a ticket 252 while the actions 224 of the ticket 252 are being performed. The device 202 can receive one or more requests at different points in time during a workflow or activity period of a ticket 252. In some embodiments, the device 202 can receive two or more requests from client devices 250 simultaneously during a workflow or activity period of a ticket 252. In embodiments, the device 202 can receive requests to view the ticket information 216 from client devices 250 of the group of users 212 in a sequential order or an order corresponding to an order of the actions 224 of the ticket 252. The actions 224 can be arranged or assigned an order identifier 228 indicating a sequential relation between the actions 224 of the ticket 252. The actions 224 can be assigned or delegated to particular users 212 of the group of users 212 and the device 202 can receive requests to view the ticket information 216 from the client devices 250 in an order corresponding to the sequential order of the actions 224. For example, a first client device 250 assigned a first action 224 of the ticket 252 can transmit a request to the view the ticket information 216 first, a second client device 250 assigned a second action 224 of the ticket 252 can transmit a request to the view the ticket information 216 second or after the first action 224 has been performed, and a third client device 250 assigned a third action 224 of the ticket 252 can transmit a request to the view the ticket information 216 third or after the first action 224 and second action 224 have been performed.

The device 202 can search or query the database using the key 208 to retrieve the data structure that includes the ticket 252 and the one or more actions 224 responsive to a subsequent request. The device 202 can continue to search or query the database using the key 208 to retrieve the data structure that includes the ticket 252 and ticket information 216 as one or more subsequent requests are received from client devices 250 of the group of users 212.

Referring now to operation (324), and in some embodiments, the ticket 252 with the key 208 can be provided. The device 202 can provide, responsive to the subsequent request, the data structure to the at least one client device 250. The device can provide the data structure including the ticket 252, the key 208, one or more actions 224 of the ticket 252 to the requesting client device 250. The device 202 can continue to provide the data structure to that includes the ticket 252 and ticket information 216 to one or more client devices 250 as one or more subsequent requests are received from client devices 250 of the group of users 212. For example, the method 300 can loop between (322) and (324) as more subsequent requests for access to ticket information 216 are received and the ticket 252 and identifier 254 are provided to different users 212 of the group of users 212.

Referring now to operation (326), a request for an interaction history of a ticket can be received. The device 202 can receive, from at least one client device 250 of the group of users 212, a request to view an interaction history for a ticket 252 including ticket information 216, electronic communications (e.g., messages, conversations) between users 212 of the group of users 212, interaction history and information 216 of the actions 224 (e.g., already performed actions, actions to be performed) for the ticket 252. The client device 250 can request to view or receive the history of each of the actions 224 already performed or already competed, electronic communications between different users 212 and associated with the already performed actions 224, a status for the actions 224 of the ticket 252. The device 202 can receive from a client device 250 of the group of users 212 to view or receive access to the feed cards 222 generated for the actions 224 already performed or already competed for the ticket 252. The feed cards 222 can include the interaction history for at least one action 224. The device 202 can receive the request to view the interaction history and/or feed cards 222 of a ticket 252 from one or more client devices 250 of the group of users 212. The request for the interaction history and/or feed cards 222 can include the key 208 provided to the client device 250 from the device 202 previously and generated for the ticket 252.

Referring now to operation (328), an interaction history can be identified or retrieved. The device 202 can search or query the database using the key 208 to retrieve one or more data structures that include the interaction history for the ticket 252. The device 202 can search or query all fields in the database to identify data structures associated with or otherwise related to the ticket 252 using the key 208. The device 202 can search or query the database using the key 208 to retrieve one or more feed cards 222 that include the interaction history for the ticket 252. The data structures can correspond to at least one action 224 of the ticket 252. The device 202 can search the database using the key 208 to identify the data structures for the actions 224 of the ticket 252. In some embodiments, the data structures can include or correspond to feed cards 222 and the device 202 can search the databased using the key 208 to identify feed cards 222 generated for the actions 224 of the ticket 252. For example, the information 216 and/or interaction history for an action 224 can be stored and maintained in a feed card 222 format and the device 202 can store and maintain the feed cards 222 in the database as data structures.

The device 202 can compile or obtain data structures or feed cards 222 for a ticket 252 (e.g., each data structure for each action, each feed card for each action) to generate or retrieve the interaction history for the ticket 252. The interaction history of ticket 252 can include, but not limited to, information 216, electronic communications (e.g., messages, conversations) between users 212 of the group of users 212 performing one or more actions 224, and status information for the actions 224 (e.g., already performed actions, actions to be performed).

Referring now to operation (330), a feed card conversation can be generated. The device 202 can generate a feed card conversation 220 or a primary data structure that includes data structures of the ticket 252. For example, the device 202 can compile or obtain data structures or feed cards 222 for a ticket 252 (e.g., each data structure for each action, each feed card for each action) to generate or retrieve the interaction history for the ticket 252. The interaction history of ticket 252 can include, but not limited to, information 216, electronic communications (e.g., messages, conversations) between users 212 of the group of users 212 performing one or more actions 224, and status information for the actions 224 (e.g., already performed actions, actions to be performed). The device 202 can combine the data structures associated with or otherwise related to the ticket 252 into a common thread or single data structure. In embodiments, the single data structure can include or correspond to a feed card conversation 220. The feed card conversation 220 can link or group the interaction history for the actions 224 of the ticket 252, including electronic communications (e.g., messages, conversations) between users 212 of the group of users 212 into a single data structure. In some embodiments, the feed card conversation 220 can include the plurality of feed cards 222 for actions 224 of the ticket 252 grouped or linked under a common thread or data structure. The feed card conversation 220 can include a listing of the plurality of feed cards 222 for actions 224 of the ticket 252 provided in a common data structure such that a client device 250 can access the plurality of feed cards 222 and the interaction history for a ticket 252 in a single display, single user interface and/or single access point.

The device 202 can organize or arrange the feed cards 222 for the actions 224 in the feed card conversation 220 in a determined order (e.g., based on age, based on when action was performed), for example, based on a timestamp 230 assigned to an action 224 and/or an order identifier 228 assigned to the action 224. For example, a first feed card 222 associated with or otherwise related to a first action 224 having a first timestamp 230 can be positioned first in the feed card conversation 220. A second feed card 222 associated with or related to a second action 224 having a second timestamp 230 (e.g., performed after the first action) can be positioned second in the feed card conversation 220. A third feed card 222 associated with or related to a third action 224 having a third timestamp 230 (e.g., performed after the first action) can be positioned second in the feed card conversation 220. In some embodiments, the order of the feed cards 222 in the feed card conversation 220 can correspond to an order in which the actions 224 were assigned or delegated to the group of users 212.

Referring now to operation (332), the feed card conversation can be provided or made accessible. The device 202 can provide the data structure to at least one client device 250 of the plurality of client devices 250 to cause the at least one of the plurality of client devices 250 to generate a graphical user interface that displays an indication of the ticket 252 (e.g., first feed card 222), the one or more subsequent electronic communications (e.g., subsequent feed cards 222), and the sequential relationship between the one or more subsequent electronic communications and the ticket 252. The device 202 can provide the received information 216 (e.g., interaction history, feed card conversation 220) to the client device 250 to identify actions 224 of at least one other user 212 of the group of users 212 relative to the action 224 of the received ticket 252. The provision of the received information can include providing the plurality of feed cards 222 displayable on the client device 250 and configured to expand or collapse to view or hide actions of different users 212 of the remote application 260. For example, the plurality of feed cards 222 can be provided to the client device 250 in the form of the feed card conversation 220. The feed card conversation 220 can enable a client device 250 to view or determine what actions 224 have been performed by other users 212 of the group of users 212 and/or determine what actions 224 still have to be performed by other users 212 of the group of users 212. The feed card conversation 220 can include or correspond to a status update for each of the actions 224 associated with the ticket 252 and thus, a status update of the ticket 252.

The feed card conversation 220 can provide access to the multiple feed cards 222 associated with or otherwise related to the ticket 252 through an interactive element 272 and a user interaction with the interactive element 272 received, for example, from a client device 250. For example, the feed card conversation 220 can include an interactive element 272 (e.g., expand icon, collapse icon) to cause the plurality of feed cards 222 to expand responsive to a first user interaction (e.g., click on, select, hover over for determined time period) with the interactive element 272 and cause all or portions of each of the plurality of feed cards 222 to be displayed, exposed or visible, for example, through a user interface of a client device 250. In some embodiments, the interactive element 272 can include a scrolling function to allow a user to scroll or move a display of one or more of the feed cards 222 to make a second of different feed card 222 more visible or more prominently shown for display in a user interface of a client device 250. A second or subsequent user interaction (e.g., click on, select, hover over for determined time period) with the interactive element 272 can cause the plurality of feed cards 222 to collapse such that the plurality of feed cards 222 are aligned or such that a first or one feed card 222 of the plurality of feed cards 222 is visible. The device 202 can provide access to the client devices 250 to the interaction history and plurality of feed cards 222 for a ticket 252 using the feed card conversation 220. The device 202 can modify, responsive to a user interaction with the interactive element 272 a position or display of one or more feed cards 222 within the feed card conversation 220 to display or provide access to the respective feed cards 222 through a display or user interface of the client device 250.

The feed card conversation 220 can improve a graphical user interface of a client device 250, for example, by providing and displaying the plurality of feed cards 222 of ticket 252 in a single display or single user interface. The expandable and collapsible display provided through the interactive element 272 can enable a client device 250 (e.g., user of client device) to access and see the plurality of feed cards 222 in a single display, for example, instead of accessing each feed card 222 individually or requesting each of the feed cards 222 individually from the device 202. The feed card conversation 220 including the interactive element 272 can provide the information about working on a ticket 252 or a completed ticket 252 to a group of users 212 in a common display such that the users 212 can access the same information in one environment.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

What is claimed is:

1. A method comprising:
providing, by one or more processors, a ticket to a group of users that access an application hosted on one or more remote computing devices, the ticket identifying an action of the application;
providing, by the one or more processors responsive to information about the action of the ticket received from one user of the group of users, to a client device of at least one other user of the group of users, one or more feed cards displayable on the client device, the one or more feed cards configured to view actions of each of the group of users with respect to the application;
updating, by the one or more processors responsive to information about the action of the ticket received from another user of the group of users, at least one of one or more feed cards on the client device; and
receiving, by the one or more processors, information about the action identified in the ticket from the at least one user of the group of users in response to provision of the ticket to the group of users.

2. The method of claim 1, further comprising receiving, by the one or more processors, the ticket from the client device.

3. The method of claim 1, further comprising determining, by the one or more processors, a key based at least on the ticket and identification of the application and the group of users.

4. The method of claim 3, wherein the key is used to access one of the ticket or the one or more feed cards.

5. The method of claim 1, wherein the one or more feed cards have a user interface configured to expand or collapse to view or hide actions.

6. The method of claim 1, wherein the one or more feed cards includes one or more electronic communications for one or more users of the group of users associated with the action.

7. A system comprising:
one or more processors, coupled to memory and configured to:
provide a ticket to a group of users that access an application hosted on one or more remote computing devices, the ticket identifying an action of the application;
provide, responsive to information about the action of the ticket received from one user of the group of users, to a client device of at least one other user of the group of users, one or more feed cards displayable on the client device, the one or more feed cards configured to view actions of each of the group of users with respect to the application; and update, responsive to information about the action of the ticket received from another user of the group of users, at least one of one or more feed cards on the client device;

wherein the one or more processors are further configured to receive information about the action identified in the ticket from the at least one user of the group of users in response to provision of the ticket to the group of users.

8. The system of claim 7, wherein the one or more processors are further configured to receive the ticket from the client device.

9. The system of claim 7, wherein the one or more processors are further configured to determine a key based at least on the ticket and identification of the application and the group of users.

10. The system of claim 9, wherein the key is used to access one of the ticket or the one or more feed cards.

11. The system of claim 7, wherein the one or more feed cards have a user interface configured to expand or collapse to view or hide actions.

12. The system of claim 7, wherein the one or more feed cards includes one or more electronic communications for one or more users of the group of users associated with the action.

13. A non-transitory computer-readable medium storing instructions that, when executed by one or more processors, cause the one or more processors to provide a ticket to a group of users that access an application hosted on one or more remote computing devices, the ticket identifying an action of the application;

provide, responsive to information about the action of the ticket received from one user of the group of users, to a client device of at least one other user of the group of users, one or more feed cards displayable on the client device, the one or more feed cards configured to view actions of each of the group of users with respect to the application;

update, responsive to information about the action of the ticket received from another user of the group of users, at least one of one or more feed cards on the client device; and receive information about the action identified in the ticket from the at least one user of the group of users in response to provision of the ticket to the group of users.

14. The non-transitory computer-readable medium of claim 13, further comprising instructions to configured to cause the one or more processors to receive the ticket from the client device.

15. The non-transitory computer-readable medium of claim 13, further comprising instructions to configured to cause the one or more processors to determine a key based at least on the ticket and identification of the application and the group of users, wherein the key is used to access one of the ticket or the one or more feed cards.

16. The non-transitory computer-readable medium of claim 13, wherein the one or more feed cards have a user interface configured to expand or collapse to view or hide actions.

17. The non-transitory computer-readable medium of claim 13, wherein the one or more feed cards includes one or more electronic communications for one or more users of the group of users associated with the action.

* * * * *